US011752819B2

(12) United States Patent
Sun et al.

(10) Patent No.: US 11,752,819 B2
(45) Date of Patent: Sep. 12, 2023

(54) WHEEL-LEGGED AMPHIBIOUS MOBILE ROBOT WITH VARIABLE ATTACK ANGLE

(71) Applicant: SHANGHAI UNIVERSITY, Shanghai (CN)

(72) Inventors: Yi Sun, Shanghai (CN); Longteng Zhang, Shanghai (CN); Huayan Pu, Shanghai (CN); Min Wang, Shanghai (CN); Yan Peng, Shanghai (CN); Jiheng Ding, Shanghai (CN); Jun Luo, Shanghai (CN); Shaorong Xie, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 262 days.

(21) Appl. No.: 17/287,491

(22) PCT Filed: Sep. 4, 2020

(86) PCT No.: PCT/CN2020/113448
§ 371 (c)(1),
(2) Date: Apr. 21, 2021

(87) PCT Pub. No.: WO2021/043254
PCT Pub. Date: Mar. 11, 2021

(65) Prior Publication Data
US 2021/0379946 A1 Dec. 9, 2021

(30) Foreign Application Priority Data
Sep. 6, 2019 (CN) .......................... 201910839471.4

(51) Int. Cl.
*B60F 3/00* (2006.01)
*B63G 8/00* (2006.01)
(Continued)

(52) U.S. Cl.
CPC ............ *B60F 3/0007* (2013.01); *B60F 3/003* (2013.01); *B63G 8/001* (2013.01); *B63G 8/04* (2013.01);
(Continued)

(58) Field of Classification Search
CPC .......... B60F 3/00; B60F 3/0007; B60F 3/003; B63G 8/001; B63G 8/04; B63G 8/08;
(Continued)

(56) References Cited

FOREIGN PATENT DOCUMENTS

| CN | 201511768 U | * | 6/2010 | ............. B60B 19/02 |
| CN | 102975782 A | | 3/2013 | |

(Continued)

OTHER PUBLICATIONS

International Search Report issued by the China National Intellectual Property Administration (ISA/CN) acting as the International Searching Authority in relation to International Application No. PCT/CN2020/113448 dated Dec. 7, 2020 (3 pages) along with English language translation (2 pages).

(Continued)

*Primary Examiner* — Stephen P Avila
(74) *Attorney, Agent, or Firm* — Robert P. Michal, Esq.; Carter, DeLuca & Farrell LLP

(57) ABSTRACT

A wheel-legged amphibious mobile robot with a variable attack angle, which belongs to the technical field of robot structure technology. The robot includes three parts: motion unit, body trunk and power unit. As a key structure, the motion unit mainly includes a moving mechanism, a wheel assembly, a telescopic mechanism and a transmission device. The robot drives the telescopic mechanism to reciprocate linearly through a gear and rack set, and pushes "legs" to expand and retract, so as to realize a mutual switching between a wheeled mode and a gait mode. Under transmission of bevel gear set, the blades can rotate at any same angle (Continued)

at the same time, to change the attack angle and realize the steering. The robot provided by the present disclosure can effectively adapt to a complex and harsh amphibious environment, and meet a series of operation requirements such as rapid movement, obstacle climbing, underwater steering.

9 Claims, 16 Drawing Sheets

(51) Int. Cl.
   *B63G 8/04* (2006.01)
   *B63G 8/08* (2006.01)
   *B63H 19/08* (2006.01)
   *B63H 21/17* (2006.01)
   *B63H 23/02* (2006.01)
   *B63H 23/32* (2006.01)

(52) U.S. Cl.
   CPC .............. *B63G 8/08* (2013.01); *B63H 19/08* (2013.01); *B63H 21/17* (2013.01); *B63H 23/02* (2013.01); *B63H 23/32* (2013.01); *B63G 2008/004* (2013.01)

(58) Field of Classification Search
   CPC .. B63G 2008/004; B63H 19/08; B63H 21/17; B63H 23/02; B63H 23/32
   See application file for complete search history.

(56) References Cited

FOREIGN PATENT DOCUMENTS

| | | |
|---|---|---|
| CN | 103600631 B | 11/2015 |
| CN | 107200075 A | 9/2017 |
| CN | 107225924 A | 10/2017 |
| CN | 107902002 A | 4/2018 |
| CN | 108750023 A | 11/2018 |
| CN | 109176461 A | 1/2019 |
| CN | 110001284 A | 7/2019 |
| CN | 110525149 A | 12/2019 |
| JP | H09136519 A | 5/1997 |

OTHER PUBLICATIONS

Written Opinion of the International Searching Authority issued by the China National Intellectual Property Administration (ISA/CN) acting as the International Searching Authority in relation to International Application No. PCT/CN2020/113448 dated Dec. 7, 2020 (5 pages).

Chinese Office Action issued by the State Intellectual Property Office of People's Republic of China in relation to Chinese Application No. 201910839471.4 dated Jul. 2, 2020 (5 pages) along with English language translation (7 pages).

* cited by examiner

WHEEL-LEGGED AMPHIBIOUS MOBILE ROBOT WITH VARIABLE ATTACK ANGLE

CROSS-REFERENCE TO RELATED APPLICATIONS

This application is a national phase entry under 35 U.S.C. 371 of PCT International Application No. PCT/CN2020/113448 filed Sep. 4, 2020, which claims the benefit under 35 USC § 119(e) to Chinese Patent Application No. 201910839471.4, filed Sep. 6, 2019, the disclosure of each of these applications are expressly incorporated herein by reference in their entireties.

TECHNICAL FIELD

The present disclosure relates to the technical field of robots, in particular to a wheel-legged amphibious mobile robot with a variable attack angle.

BACKGROUND ART

At present, it is not suitable for human to performing operations in a lot of activity fields such as rescue and relief, archaeological exploration, and scientific research, and there is an urgent need for a robot that can replace human to complete expected tasks safely and efficiently. Therefore, it has important research significance to provide a mobile robot that can be amphibious and adapt to different terrains.

Upon a large number of investigations, it is found that most of the current mobile robots are very single in driving mode and adaptability, and their comprehensive performance is low. Most of common mobile robots are wheeled, legged and tracked. However, in a complex and harsh amphibious environment, the three kinds of robots have many shortcomings in varying degrees. Wheeled robots have poor environmental adaptability, low fault tolerance rate, and can only adapt to smooth road; legged robots have complex structure, slow speed, high power consumption, and poor stability; and tracked robots have poor flexibility and heavy weight. When operating in water, mobile performance of the three kinds of robots is far from desired requirement.

Chinese Patent Publication No. CN 107902002 A discloses a combined wheel-legged mobile robot. The robot is mainly composed of a body trunk, a combined wheel-legged device and a power device. It has high-speed mobile performance and effective ability of obstacle avoidance. However, the structure of the robot is too simple, it can only move on land in a wheeled mode and in a legged mode, cannot achieve amphibious operations, and has no underwater operation function. Furthermore, the robot has no steering function, only has a certain linear movement performance, which needs to be further improved.

Chinese Patent Publication No. CN 103600631B discloses an amphibious wheel mechanism based on eccentric propeller mechanism. The eccentric propeller mechanism is mainly composed of a driving component, a transmission component and a wheel propeller component. It can achieve a better switching between wheeled movement and legged walking of the robot, and has good adaptability to environments. However, it has a complex structure, a complicated transmission mode, and an extremely complex control method. Furthermore, the robot does not have an underwater steering function, and the operation range is limited, which needs to be further improved.

Chinese Patent Publication No. CN 109176461 A discloses a wheel-legged obstacle surmounting robot, including a frame and a wheel-legged mechanism connected with each other. A wheel body device is rotatably connected with a wheel body steering device. The robot can travel in all directions with multiple degrees of freedom and has a good obstacle surmounting performance. However, the robot has a very complex steering control method, and it cannot perform amphibious operations. The robot does not have a function of underwater operation, and the working environment for the robot is limited. Therefore, it needs to be further improved.

SUMMARY

The present disclosure is aimed to provide a wheel-legged amphibious mobile robot with a variable attack angle, so as to solve the problems existing in the prior art. The robot has a compact structure and a simple configuration, meets requirements for movement performance of rotor in three different modes of wheeled, legged and underwater motions. It is innovatively provided an amphibious mobile robot. On the basis of meeting operation requirements, in combination with movement characteristics of the robot itself, the robot also has a function of steering, which greatly improves overall utilization rate and environmental adaptability of the robot. Therefore, the robot can complete an operation in a complex and changeable land environment and an underwater environment, which provides a technical support for tasks such as rescue, exploration, scientific research.

In order to achieve the above purposes, the present disclosure provides the following technical solutions: it is provided a wheel-legged amphibious mobile robot with a variable attack angle, including two motion units, a body trunk, two main shafts and a power device. The two motion units have a same structure, the power device includes two first power units, two second power units and one third power unit. One of the two motion units, one of the two second power units, one of the two first power units, the third power unit, another of the two first power units, another of the two second power unit and another of the two motion units are successively arranged in series. Two ends of one of the two main shafts are fixedly connected with the one of two motion units and the one of the two first power unit respectively at one side of the third power unit, and two ends of another main shaft are fixedly connected with the another of two motion units and the another of the two first power unit at another side of the third power unit. The third power unit and the two first power units are provided within the body trunk; the power device is configured to drive the motion units to move in a wheeled mode or in a gait mode.

In some embodiments, the two motion units each include a wheel assembly, a transmission device, moving mechanisms and a telescopic mechanism. The wheel assembly includes a slotted wheel, a shaft seat and a rotating disc. The transmission device includes a bevel gear set and two gear and rack sets, and the moving mechanism each includes blades, links, a hinge block, a sliding rod and a rotating support, the telescopic mechanism includes a telescopic disc.

One side of the shaft seat is fixedly connected to a central position of the slotted wheel, the rotating disc is fixed to another side of the shaft seat, and one end of each of the two main shafts is fixed to the shaft seat. The bevel gear set includes one bevel gear and three identical bevel pinions; the three bevel pinions are evenly distributed around a outer periphery of the bevel gear by tooth meshing, and the bevel gear is fixed to a shaft barrel on each of the two main shafts by set screws. Each of the three bevel pinions is fixed to the rotating support through set screws. The third power unit drives the two gear and rack sets to move, thus drive the telescopic disc to move back and forth. A plurality of slots are uniformly distributed on the slotted wheel, one end of the link is fixedly connected to the shaft seat at a position of the shaft seat corresponding to corresponding one of the plurality of slots; another end of the link is connected with the hinge block through a bearing; the hinge block is connected with the sliding rod through a plastic bearing; two ends of the sliding rod are fixed to the blades; the blades are hinged with the rotating support, and the blades are accommodated in the corresponding one of the plurality of slots in the slotted wheel.

In some embodiments, a plurality of lightening holes are evenly and symmetrically provided on the slotted wheel; a rotating-disc pressure plate is arranged on the rotating disc, and the rotating disc rotates synchronously with the wheel assembly; a connecting shaft of each of the three bevel pinions passes through the rotating disc and is fixedly connected with the rotating support, and the rotating support is fixed to the rotating disc.

In some embodiments, the two gear and rack sets are one gear and rack set at a front end of the body trunk and another gear and rack set at a rear end of the body trunk; the rack is connected to the telescopic disc by bolts, the gear at the front end of the body trunk is connected to a bearing at a front end of a push-pull shaft of the third power unit, the gear at the rear end of the body trunk is connected to a rear end of the push-pull shaft of the third power unit by keys; the gear and rack set at the front end of the body trunk is driven passively, and a power of the gear and rack set at the rear end of the body trunk comes from driving force from the third power unit to the gear.

In some embodiments, with help of the link, the telescopic mechanism brings the blades to expand from inside toward outside, close to an outer side of the slotted wheel, and legs each formed by two blades are evenly distributed at the outer periphery of the slotted wheel, so as to realize a switching from the wheeled mode to the gait mode of the robot; when the blades are retracted from outside toward inside, each of blades snaps into the corresponding one of the plurality of slots of the slotted wheel, so as to realize a switching from the gait mode to the wheeled mode of the robot; when the robot is in the gait mode, the rotating support rotates at any angle in the rotating disk with assistance of a bearing, which is a second degree of freedom of the robot.

In some embodiments, the body trunk includes a frame, a bottom plate and an adaptive tail wing; the frame includes an upper plate and a lower plate; the upper plate is provided with a plurality of through holes; the adaptive tail wing is connected to a bottom of the lower plate connected with the upper plate, at one side of the lower plate; and a portion of the lower plate close to the bottom plate is streamlined, and the bottom plate is a transition member for connection between the lower plate and the adaptive tail wing.

In some embodiments, each of the two first power units includes a rotating disc, a harmonic reducer, a mounting plate, a direct current brushless motor and an encoder; the rotating disc is fixedly connected with one side of the harmonic reducer; a fixing member is installed on another side of the harmonic reducer; the fixing member is connected and fixed with the mounting plate through a connecting rod; the direct current brushless motor is fixed on the mounting plate, and the encoder is fixedly connected with the fixing member; a connecting disc is fixedly connected with the direct current brushless motor, and an encoding disk is fixed on the connecting disc.

In some embodiments, each of the two second power units includes a motor disc pressure plate, a mounting plate, a direct current brushless motor and an encoder; the motor disc pressure plate is fixedly connected with a fixing member; the fixing member is connected with the mounting plate through a connecting rod; the direct current brushless motor is fixed on the mounting plate, the encoder is fixedly arranged on the fixing member; a connecting disc is connected with the direct current brushless motor through hexagon socket head bolts with spring washers; and an encoding disk and the connecting disc are fixed by hexagon socket round head bolts.

In some embodiments, the third power unit includes two mounting plates, a direct current brushless motor, an encoder and a push-pull shaft; the two mounting plates are connected through a connecting rod; the pressure plate is fixedly connected with the two mounting plates; the direct current brushless motor is fixed on one of the two mounting plates at one side, another one of the two mounting plates at another side is connected with the encoder through hexagon socket round head bolts, and a connecting disc and the direct current brushless motor are connected through hexagon socket head bolts with spring washers; an encoding disk is fixed with the connecting disc through hexagon socket round head bolts; the push-pull shaft is fixedly connected with the connecting disc through hexagon socket head bolts; a locking stop collar is fixed on one end of the push-pull shaft through set screws.

Compared with the prior art, the present disclosure has the following technical effects:

1. The wheel-legged amphibious mobile robot with the variable attack angle provided by the present disclosure drives a telescopic mechanism to reciprocate linearly through a rack; the legs of the robot expand and retract in a similar manner to that of an umbrella, so as to realize a switching between a wheeled mode and a legged mode. The robot has simple configuration and compact structure, can meet requirements for the robot of climbing over obstacles, can adapt to complex, variable and uneven environment, and has improved operation efficiency and wide application.

2. Six blades are combined to form three "legs" for the robot walks forward, so that the robot can move underwater while walking forward on land, thus amphibious operations can be achieved, enhancing environmental adaptability of the robot and improving motion performance of the robot.

3. In a legged mode, through transmission function of the bevel gear set, six blades can rotate at any same angle at the same time with two drive groups on the left and right independent of each other, so as to change the attack angle of the robot to realize a transfer in different directions. Such structure is simple and effective, has simple control method, and stable transmission, and can better adapt to harsh and changeable environment.

4. In order to improve motion efficiency of the robot operated underwater, reduce fluid resistance and reduce energy consumption, the body trunk of the robot is designed to be streamlined.

5. The robot is provided with an adaptive tail wing, which is hinged with a bottom plate through a pivot pin. When the robot moves underwater, the tail wing swings up and down with the water wave, to reduce fluid resistance and propel the robot to some extent, improving motion performance of the robot.

6. The power take-off device matched with three degrees of freedom for the robot includes rotating power output, steering power output and telescopic power output. The 130V direct current brushless motor is adopted to cooperate with an encoder and a harmonic reducer, and the motor is rotated by an outer wheel, and the data related to position and gesture of the robot can be analyzed by an encoding disk.

7. A frame part of a body trunk is made by 3D printing. On the one hand, it protects internal parts of the robot from damage in harsh environment; on the other hand, 3D printing materials are light, easy to process, cost saving, and suitable for underwater operation and reduce energy consumption.

8. The robot has a simple structure and a compact configuration. All components are provided with lightening slots and holes, which greatly reduces the weight of the robot itself.

9. A large number of connecting rods are adopted, not only for connection but also for saving assembly space of the robot, reducing overall weight of the robot.

10. The robot adopts a series of waterproof motors and components, combined with silica gel and other materials for waterproof and antirust treatment, in order to adapt to underwater working conditions and complex and harsh environment.

BRIEF DESCRIPTION OF THE DRAWINGS

In order to more clearly illustrate embodiments of the present disclosure or the technical solutions in the prior art, the following will briefly describe the accompanying drawings involved in the embodiments. It is apparent that the drawings in the following description are only some embodiments of the present disclosure. For an ordinary person skilled in the art, other drawings can also be obtained on the basis of these drawings without making creative work.

LIST OF REFERENCE NUMERALS

1 motion unit; 11 wheel assembly; 111 slotted wheel; 112 shaft seat; 113 rotating disc; 114 rotating-disc pressure plate; 12 transmission device; 121 link; 122 bearing; 123 guard plate; 124 blade; 125 hinge block; 126 rotating support; 127 bearing; 128 sliding rod; 129 locking nut; 1210 plastic bearing; 13 moving mechanism; 131 bevel gear; 132 bevel pinion; 133 rack; 134 gear; 14 telescopic mechanism; 141 telescopic disk; 142 telescopic-disk outer pressure plate; 143 telescopic-disk inner pressure plate; 144 bearing; 2 body trunk; 21 upper plate; 22 side plate; 23 bottom plate; 24 lower plate; 25 adaptive tail wing; 3 power device; 4 connecting pipe; 5 first power unit; 51 rotating disk; 52 harmonic reducer; 53 fixing member; 54 direct current brushless motor; 55 connecting rod; 56 mounting plate; 57 encoder; 58 encoding disk; 59 connecting disk 6 second power unit; 61 motor disc pressure plate; 62 fixing member; 63 connecting rod; 64 encoder; 65 direct current brushless motor; 66 mounting plate; 67 encoding disk; 68 connecting disc; 7 third power unit; 71 mounting plate; 72 encoder; 73 pressure plate; 74 connecting rod; 75 direct current brushless motor; 76 mounting plate; 77 push-pull shaft; 78 locking stop collar; 79 bearing; 710 encoding disk; 711 connecting disc; 8 shaft barrel; 9 locking stop collar

DETAILED DESCRIPTION OF THE EMBODIMENTS

Figure 1:
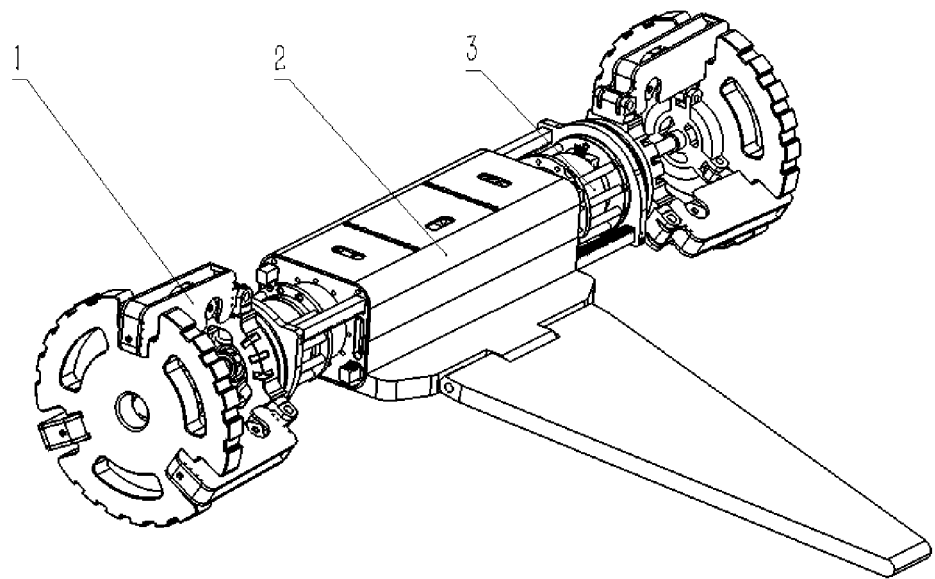
FIG. 1 shows a wheel mode of a wheel-legged amphibious mobile robot with a variable attack angle.
Figure 2:
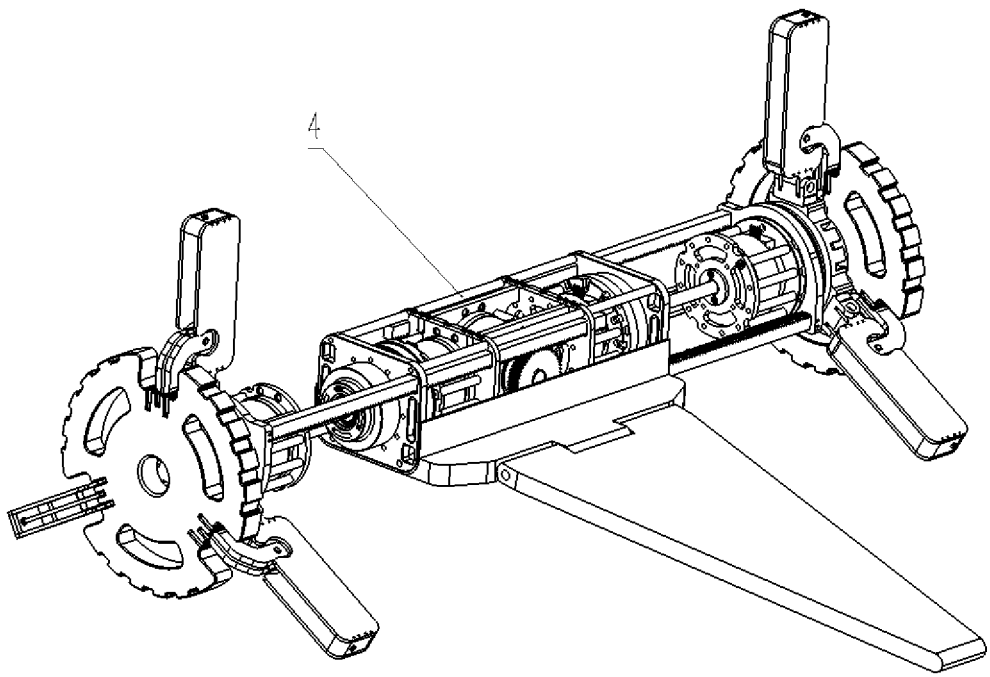
FIG. 2 shows a gait mode of the wheel-legged amphibious mobile robot with the variable attack angle.

As shown in FIG. 1 and FIG. 2, two kinds of movement modes of a robot, i.e., a wheeled mode and a gait mode, are shown. As a whole, the robot includes two motion units 1, a body trunk 2 and three groups of power devices 3. The two motion units 1 are fixedly connected with each other through four connecting pipes 4 by hexagon socket head blots with spring washers. The power devices 3 are fixedly connected with the body trunk 2 through cross recessed round head screws.

Figure 3A:
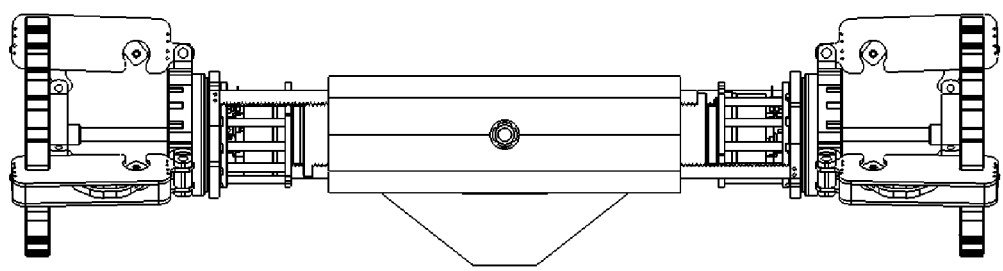
FIG. 3a is a front view of the robot in the wheel mode.
Figure 3B:
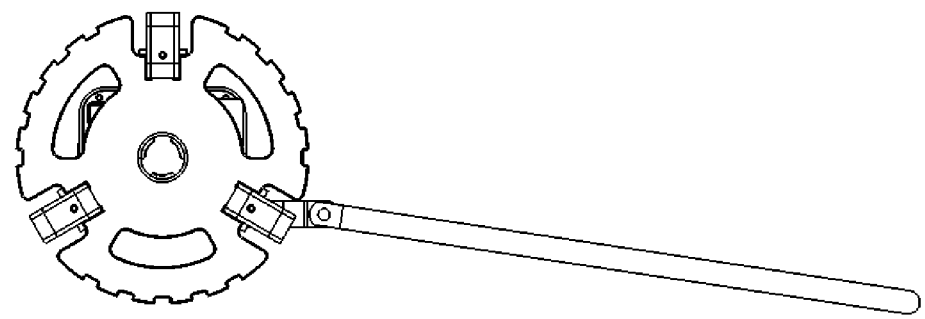
FIG. 3b is a side view of the robot in the wheel mode.
Figure 3C:
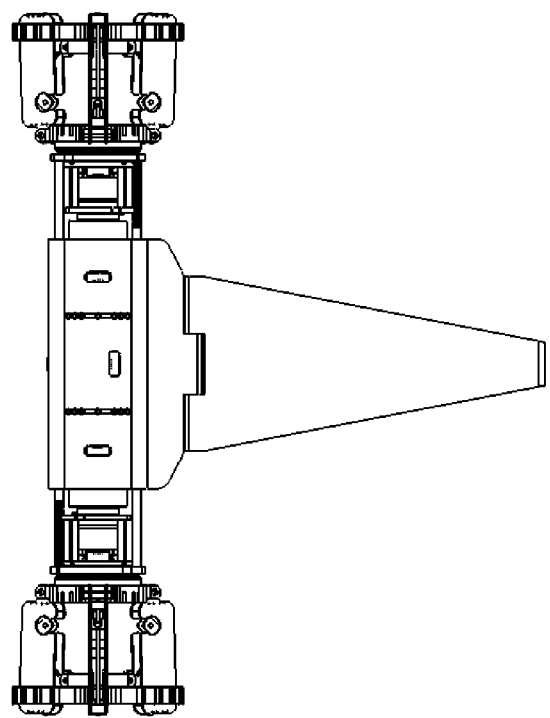
FIG. 3c is a top view of the robot in the wheel mode.

FIG. 3a, FIG. 3b and FIG. 3c show three views of the robot in a wheeled mode, according to the present disclosure. In the wheeled mode, a telescopic power take-off device provides power so as to drive the rack to push the telescopic mechanism 14 to move along a straight line from outside toward inside. Three "legs" formed by six blades 124 are retracted into slotted wheels 111, and form a "round wheel" together with the slotted wheel 111. Then, the rotating power take-off device provides power, to drives wheel assembly 11 to rotate via the main shaft, so as to realize wheeled movement of the robot.

Figure 4A:
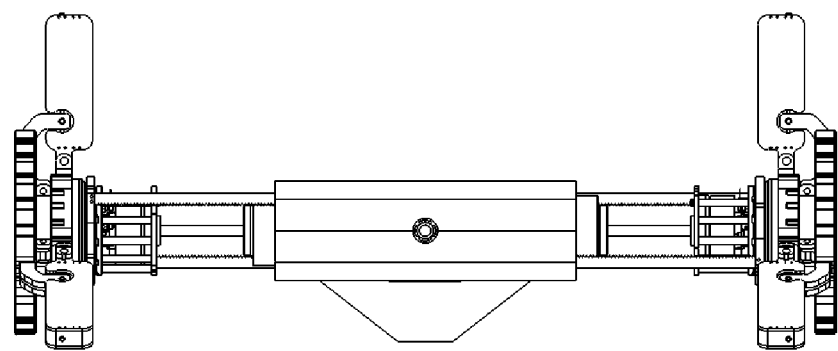
FIG. 4a is a front view of the robot in the gait mode.
Figure 4B:
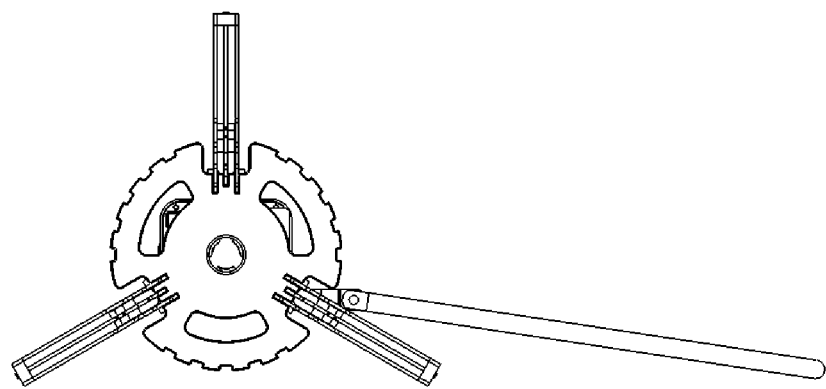
FIG. 4b is a side view of the robot in the gait mode.
Figure 4C:
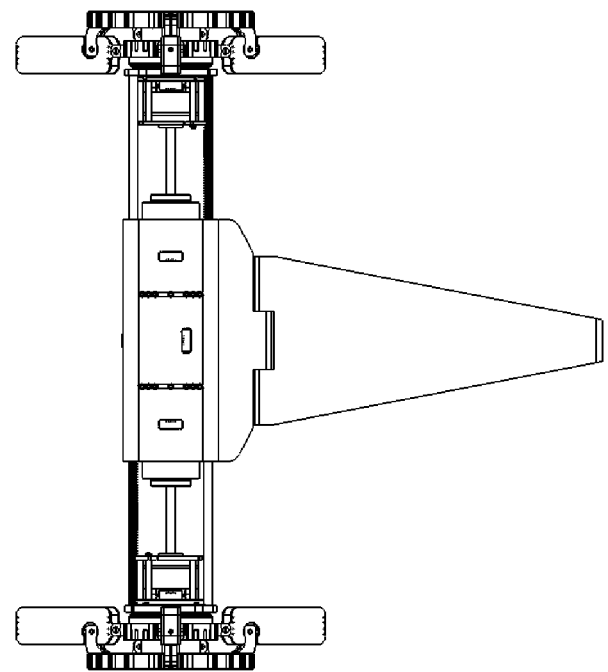
FIG. 4c is a top view of the robot in the gait mode.

FIG. 4a, FIG. 4b and FIG. 4c shows three views of the robot in the gait mode according to the present disclosure. In the gait mode, the telescopic power take-off device provides power, so as to drive the rack to push the telescopic mechanism 14 to move in a straight line from inside toward outside. Three "legs" formed by six blades 124 are expanded at the slotted wheel 111 to form three "legs" of the robot.

Then, the rotating power take-off device provides power, to drive "legs" to walk forward via the main shaft, so as to realize gait movement of the robot.

Figure 5:
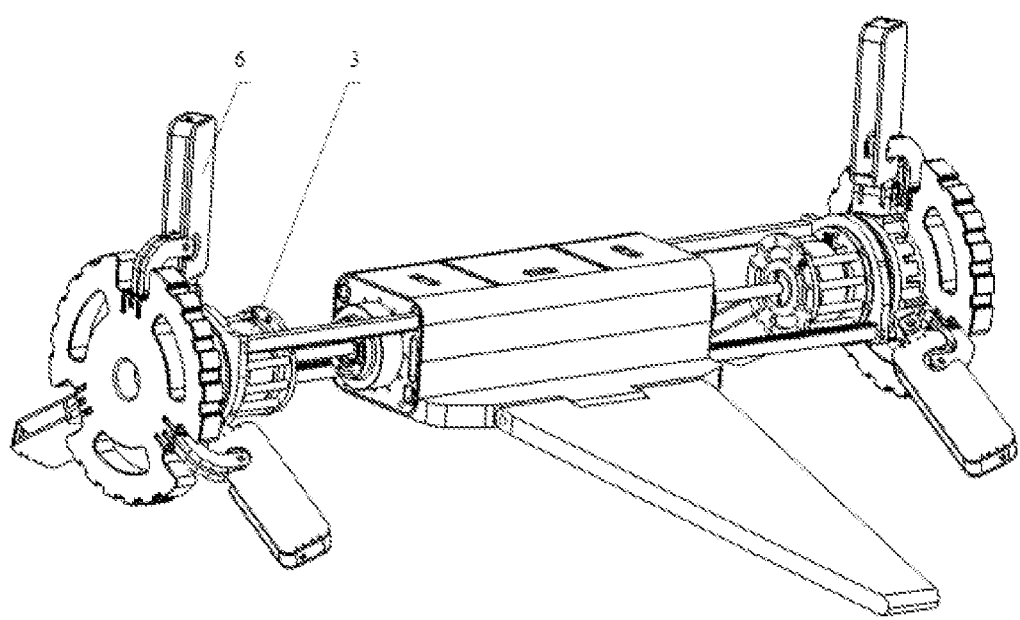
FIG. 5 is a schematic diagram of a three-dimensional structure of the robot in a steering mode.

FIG. 5 is a schematic diagram of a three-dimensional structure of the robot in a steering mode, according to the present disclosure. In the steering mode, a steering power device provides power, which is transmitted through a bevel gear set, to drive the bevel pinion 132 and in turn the blades 124 to rotate at any same angle, so as to change the attack angle of the robot, realizing the steering.

Motion Unit

Figure 6:
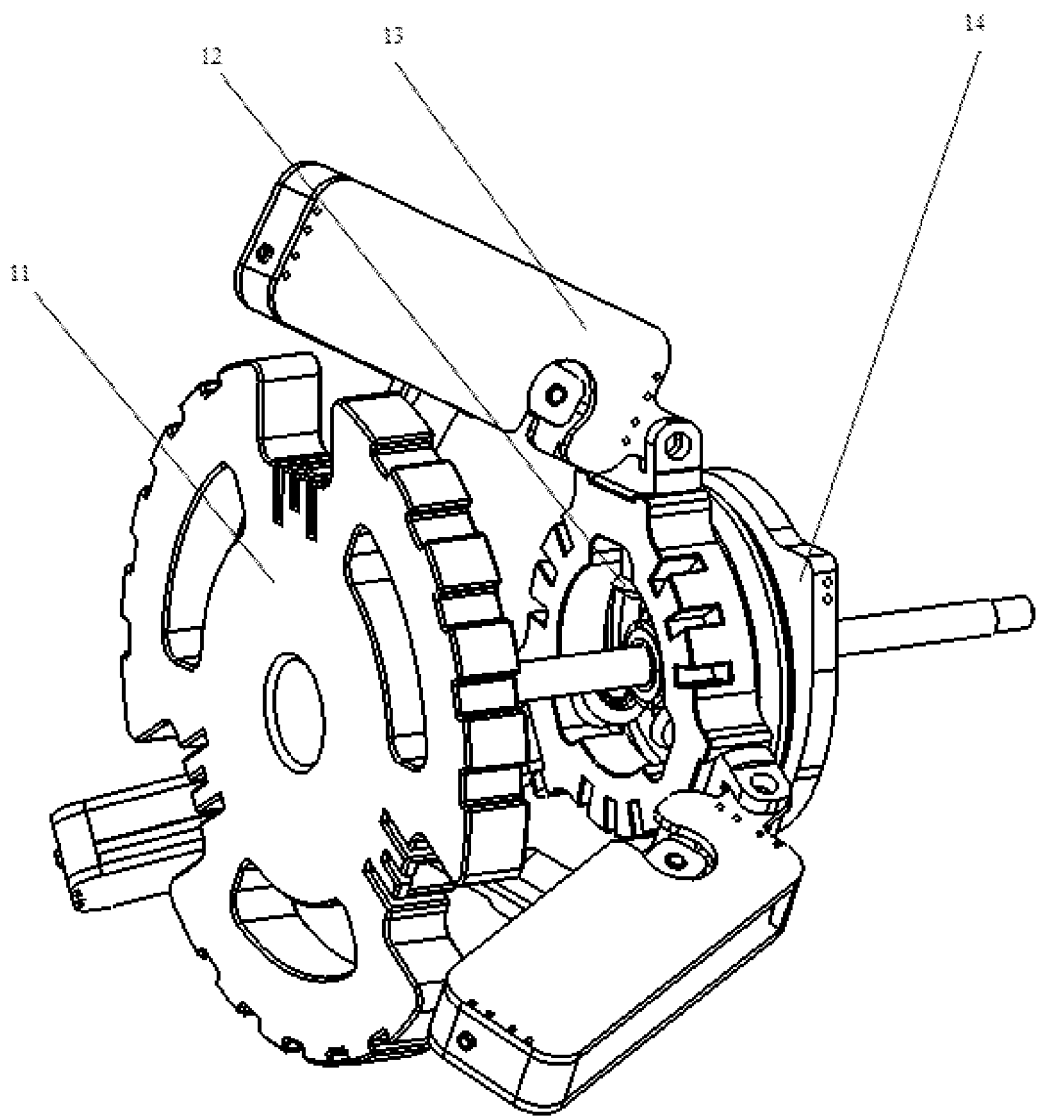
FIG. 6 is a schematic diagram of a three-dimensional structure of a motion unit of the robot.

As shown in FIG. 6, the motion unit of the robot according to the present disclosure mainly includes a wheel assembly 11, a moving mechanism 13, a telescopic mechanism 14 and a transmission device 12. A shaft seat 112 of the wheel assembly 11 is connected with the main shaft of the transmission device 12 through a flat key, and is hinged with the link 121 of the moving mechanism 13. The rotating disc 113 of the wheel assembly 11 and the telescopic mechanism 14 are engaged with each other through a bearing. The rotating support 126 of the moving mechanism 13 and the rotating disc 113 of the wheel assembly 11 are engaged with each other through a bearing. The rotating support 126 of the moving mechanism 13 is connected with the bevel gear set of the transmission device 12 through a flat key. The motion unit 1 is a core part of the robot, which is a key component to realize wheeled, gait and underwater movement of the robot. The motion unit 1 is also a key structure enabling the robot to be amphibious to suit for complex and changeable environment.

Figure 7:
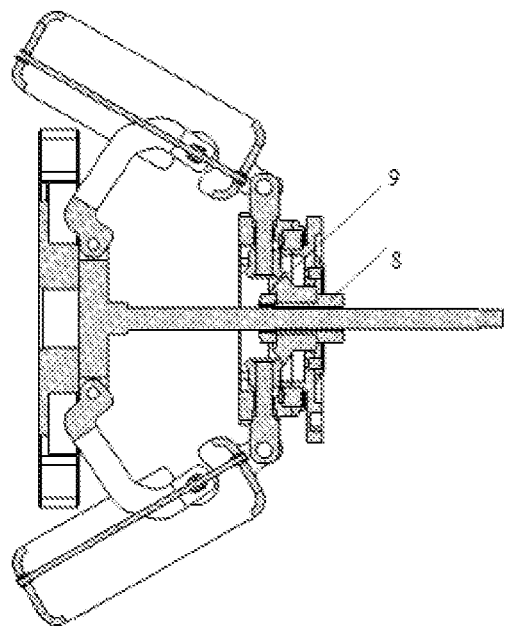
FIG. 7 is a sectional view of the structure of the motion unit.
Figure 8:
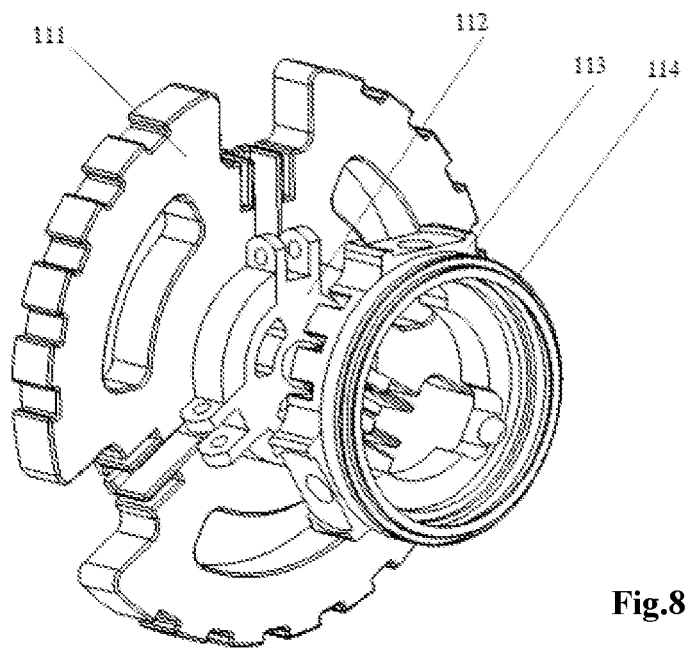
FIG. 8 is a schematic diagram of a three-dimensional structure of a wheel assembly.

As shown in FIG. 7, the shaft barrel 8 and the bevel gear set are fixed to each other by a locking stop collar 9. As shown in FIG. 8, the wheel assembly provided by the present disclosure mainly includes a slotted wheel 111, a shaft seat 112, a rotating disc 113 and the like. The slotted wheel 111 and the shaft seat 112 are connected by hexagon socket head bolts, and the rotating disc 113 and a rotating-disc pressure plate 114 are connected by cross recessed round head screws. The wheel assembly 11 is the first degree of freedom of the robot, which provides a mobile basis for wheeled and gait movement of the robot. On the one hand, the slotted wheel 111 provides protection support for wheeled and legged movement of the robot; on the other hand, it provides space for retracting "legs" of the robot when the gait mode is converted to the wheeled mode. The slotted wheel 111 is configured to hold "legs" of the robot, and form a "round wheel" of the robot together with outer side surfaces of three "legs". Furthermore, a lot of lightening holes are formed on the slotted wheel 111, which is more convenient for the robot to move underwater. The shaft seat 112 is connected to the main shaft with an assembly space for single direction rotation of the link 121 formed there. A rotating disc assembly includes a rotating disc 113 and a rotating disc pressure plate 114. The rotating disc 113 rotates synchronously with the wheel assembly 11, and provides assembly space for the moving mechanism 13 of the robot, to realize changes of the attack angle when the robot moves underwater. The structure of the whole wheel assembly is reasonable and reliable, with very high space utilization rate.

Figure 9:
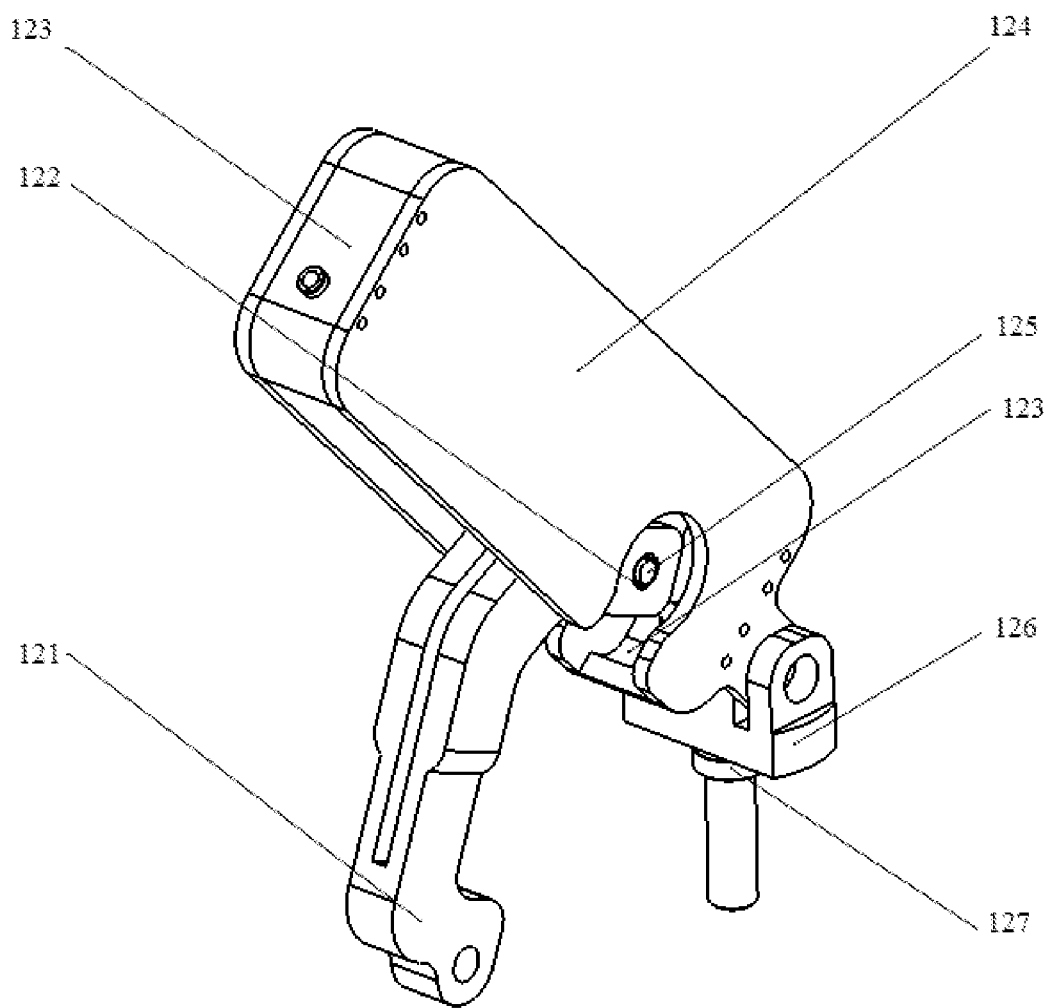
FIG. 9 is a schematic diagram of a three-dimensional structure of a moving mechanism.
Figure 10:
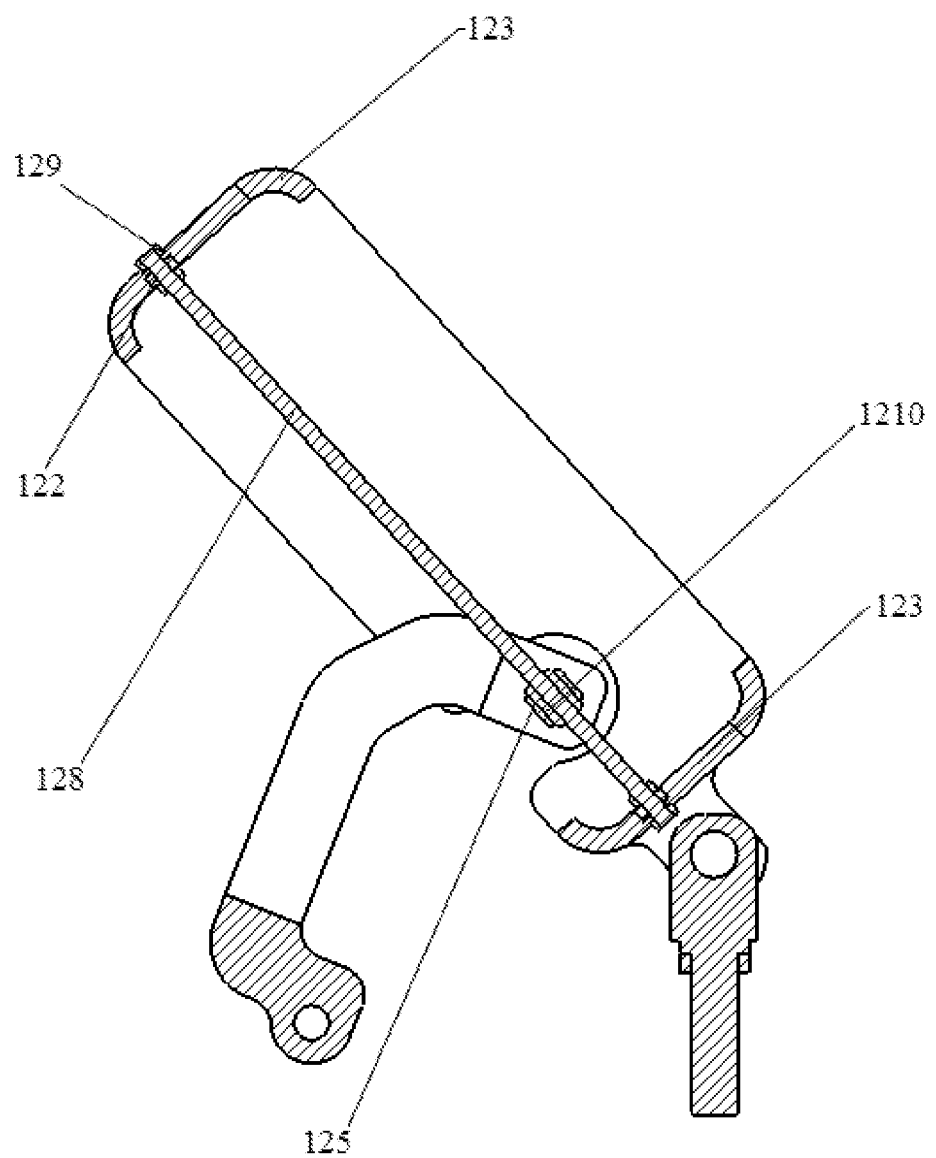
FIG. 10 is a sectional view of the structure of the moving mechanism.

As shown in FIG. 9-10, the link 121 and the hinge block 125 are engaged through bearings 122 at both ends of the hinge block 125 to form a revolute pair to expand and retract the blade 124. Furthermore, the link 121 is hinged with the shaft seat of the wheel assembly to allow a rotation of the link 121 in a single direction. The guard plate 123 and the blades 124 are fixedly connected by cross recessed round head screw, and the blades 124 and the rotating support 126 are hinged to form a revolute pair. The blades 124 are rotated at any angle to change the attack angle of the robot. The sliding rod 128 is engaged with the hinge block 125 through the plastic bearing 1210 to form a sliding pair. Furthermore, the sliding rod 128 is engaged with the guard plate 123 through the bearing 122, and both ends of the sliding rod 128 are fixed by the locking stop collar 129. The moving mechanism 13 provided by the present disclosure mainly includes the blades 124, a guard plate 123, the sliding rod 128, the bearing 122, the hinge block 125, the plastic bearing 1210, the link 121, and the rotating support 126. The moving mechanism 13 is a key mechanism for switching between a wheeled mode and a legged mode, performing amphibious operations, and steering movement of the whole robot. The link 121 and the hinge block 125 form the revolute pair through the bearing 122, the hinge block 125 and the sliding rod 128 form the sliding pair through the plastic bearing 1210, and the blade 123 and the rotating support 126 form the revolute pair. The switching between a wheeled mode and a legged mode of the robot is implemented by reciprocating push and pull of the telescopic mechanism 14. By means of the link 121, the telescopic mechanism 14 drives the blades 124 to expand from inside toward outside, close to an outer end of the slotted wheel 111, such that "legs" each formed by two blades 124 are distributed uniformly around an outer periphery of the slotted wheel 111, to switch from the wheeled mode to the gait mode of the robot. Further, when the blades 124 are retracted from outside to inside, each blade 124 snaps into a slot of the slotted wheel 111, to switch from a gait mode to a wheeled mode of the robot. When the robot is in a gait mode, the rotating support 126 can rotate at any angle in the rotating disk 113, with help of the bearing, as the second degree of freedom of the robot, so as to change the angle of attack and realize steering function of the robot. Furthermore, the robot is provided with a guard plate 123 to enhance stability and effectiveness of the "leg". Compared with the traditional wheel-legged robot, this design method not only enables the robot to operate on land and underwater, steer and move, but also allows the switching between a wheeled mode and a leg mode of the robot. Furthermore, the embodiment allows the mechanical structure of the robot to be greatly simplified, is more compact and simple in assembly, and has higher reliability.

Figure 11:
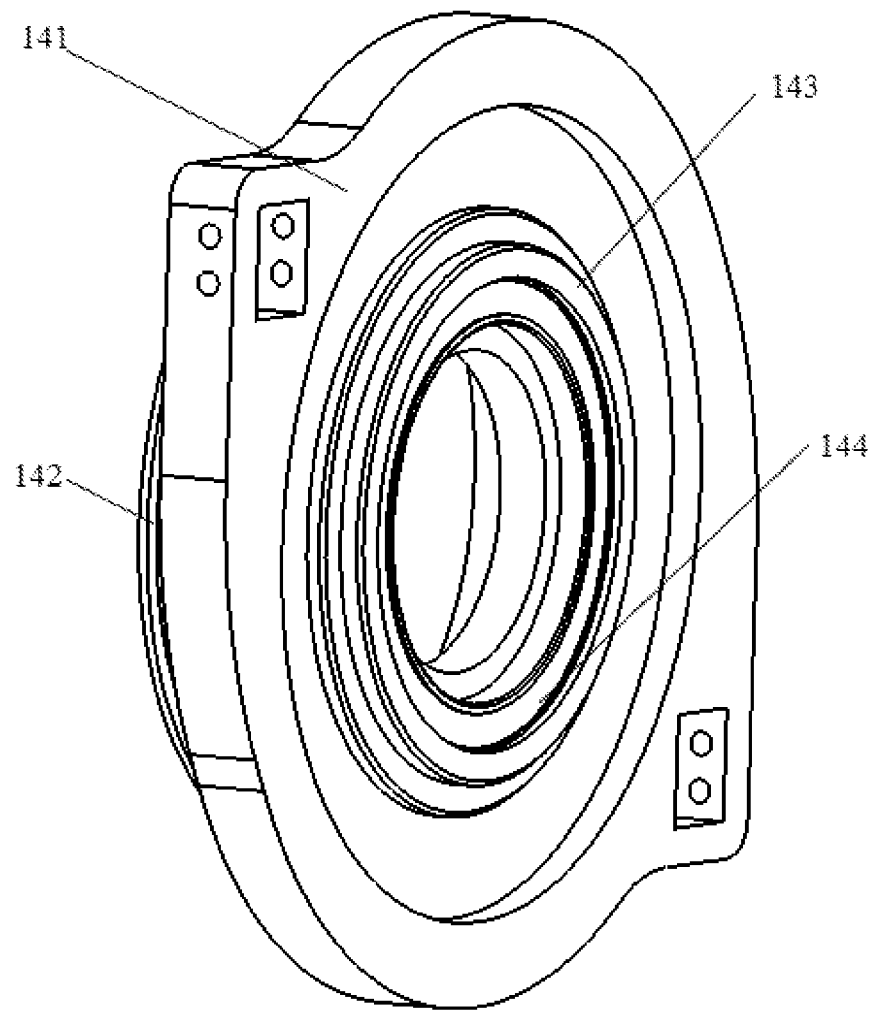
FIG. 11 is a schematic diagram of a three-dimensional structure of a telescopic mechanism.

As shown in FIG. 11, the telescopic mechanism 14 is mainly fixedly engaged with the rack of the transmission device 12, and is linearly reciprocated to switch between a wheeled mode and a legged mode of the robot. The telescopic disk 141 is fixedly connected with a telescopic-disk inner pressure plate 142 and a telescopic-disk outer pressure plate 143 through cross recessed round head screws. The telescopic mechanism 14 is the third degree of freedom of the robot. The telescopic disk 141 is driven by the gear and rack to move back and forth to provide power for switching between a wheeled mode and a legged mode of the robot. Furthermore, the telescopic mechanism 14 is independent with respect to the wheel assembly 11 and the moving mechanism 13, and does not participate in rotation, to provide support for the wheeled and gait movement of the robot.

Figure 12A:
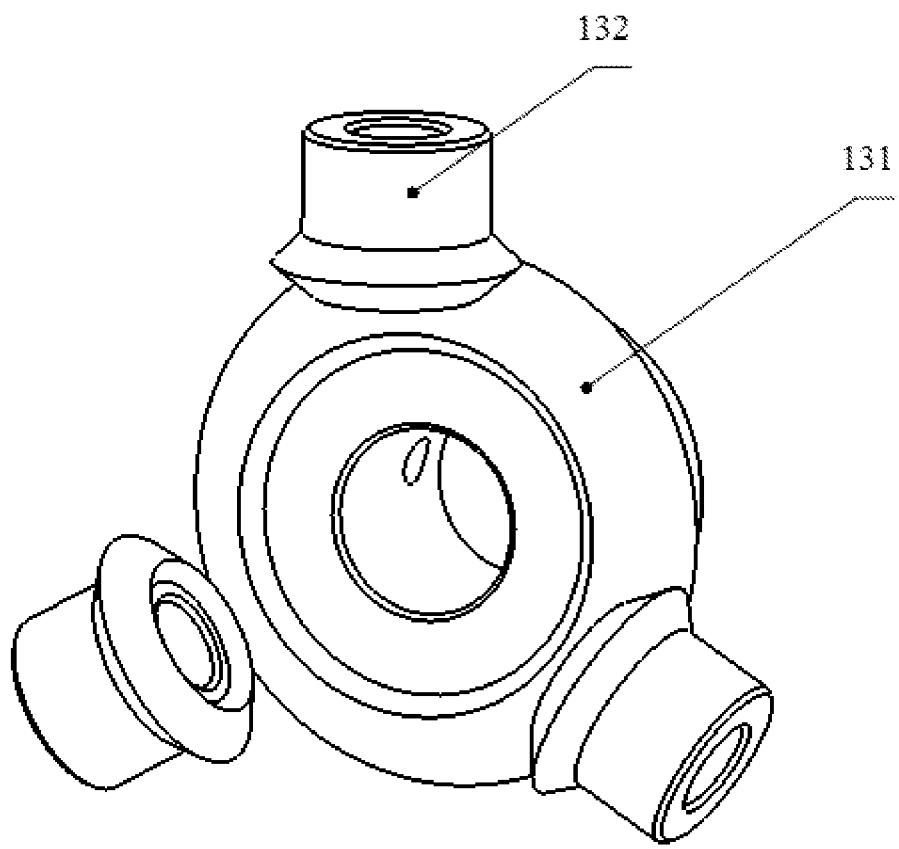
FIG. 12a is a schematic diagram of a three-dimensional structure of a bevel gear set in a transmission device.
Figure 12B:
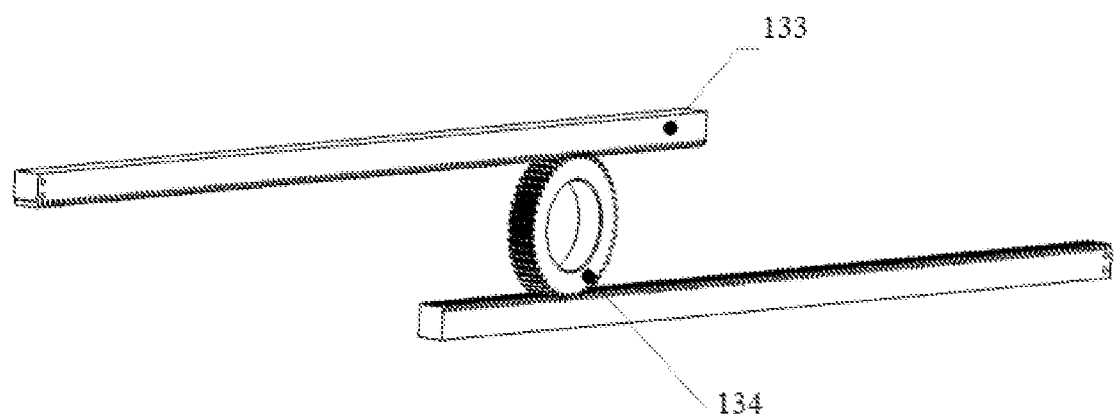
FIG. 12b is a schematic diagram of a three-dimensional structure of a rack and gear set in a front end of the transmission device.
Figure 12C:
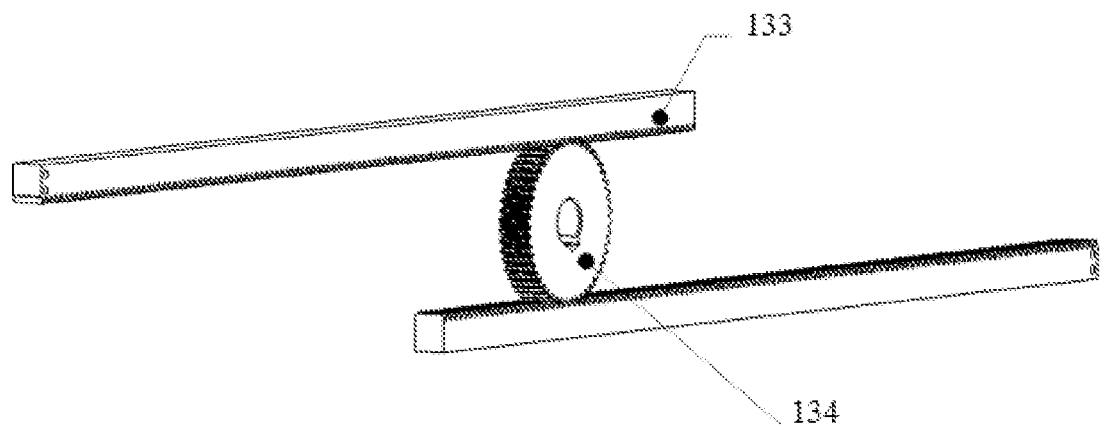
FIG. 12c is a schematic diagram of a three-dimensional structure of a rack and gear set in a rear end of the transmission device.

As shown in FIG. 12a, FIG. 12b and FIG. 12c, the transmission device provided by the present disclosure mainly includes the main shaft, the bevel gear set and a gear and rack set. Three kinds of transmission are respectively driven by three kinds of power devices, and the rack 133 is fixed on the telescopic disc 141 by hexagon socket head bolts with spring washers. The bevel gear set includes a bevel gear 131 and three identical bevel pinions 132. The three bevel pinions 132 are evenly distributed around an outer periphery of the bevel gear 131 by tooth meshing. The bevel gear 131 as a driving gear is fixed on the shaft barrel 8 through set screws, and the bevel pinions 132 as driven pinions are fixed on the rotating support 126 through set screws. The two rack and gear sets each include one gear 133 and two racks 134. The gear 134 is located between the two racks 133 through tooth meshing, and the racks 133 are fixed in the telescopic disc 141 through hexagon socket head blots with spring washers.

The main shaft transmits power for movement of the whole robot. The bevel gear set allows underwater steering function of the robot, the gear and rack set transmits power to the telescopic mechanism 14, and pushes the telescopic disk 141 to reciprocate linearly, so as to switch between a wheeled mode and a legged mode of the robot.

Body Trunk

Figure 13:
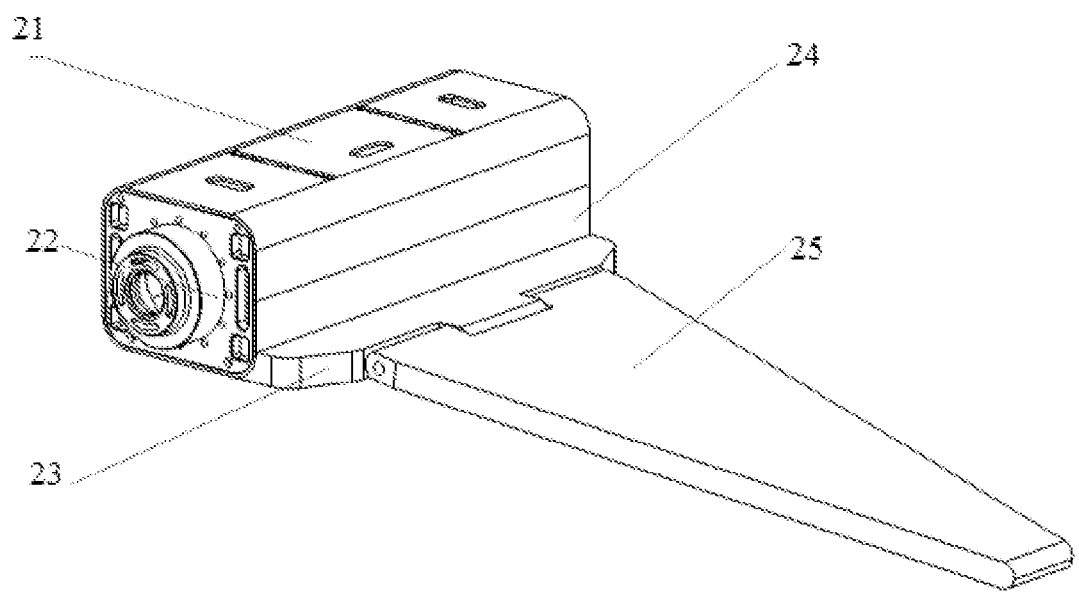
FIG. 13 is a schematic diagram of a three-dimensional structure of a the body trunk.

As shown in FIG. 13, the body trunk 2 provides assembly space for the robot, and also provides certain safety protection support for the robot during motion operation. An upper plate 21, a side plate 22, a bottom plate 23 and the lower plate 24 are fixedly connected with each other through hexagon socket head blots with spring washer. The bottom plate 23 and the adaptive tail wing 25 are hinged through a pivot pin in order to enable the tail wing to swing up and down, so that work efficiency and the stability of the robot operated on land and underwater are improved, with lower energy consumption. The body trunk 2 is a skeleton of the robot. The body trunk 2 not only provides assembly space for components of the robot, but also provides safety protection for operations of the robot such as movement, obstacle avoidance. In particular, the streamline design for the trunk of the robot can reduce fluid resistance to the greatest extent when the robot works underwater.

The bottom plate 23 is a transition member for connecting the lower plate 24 and the adaptive tail wing 25. The adaptive tail wing 25, by increasing or decreasing a weight block, enhances overall stability and effectiveness of the robot when the robot moves on land and crosses obstacles, and prevents the robot from rollover. Furthermore, the tail wing provides space for electrical components and the like of the robot. In particular, when operating underwater, the adaptive tail wing 25 can swing up and down adaptively following a fluctuation of water flow, which saves power consumption, improves driving efficiency and enhances stability and mobility of the robot. The side plate 22 provides safety protection support against the impact on both sides of the robot in the underwater and land environment.

Power Device

Figure 14:
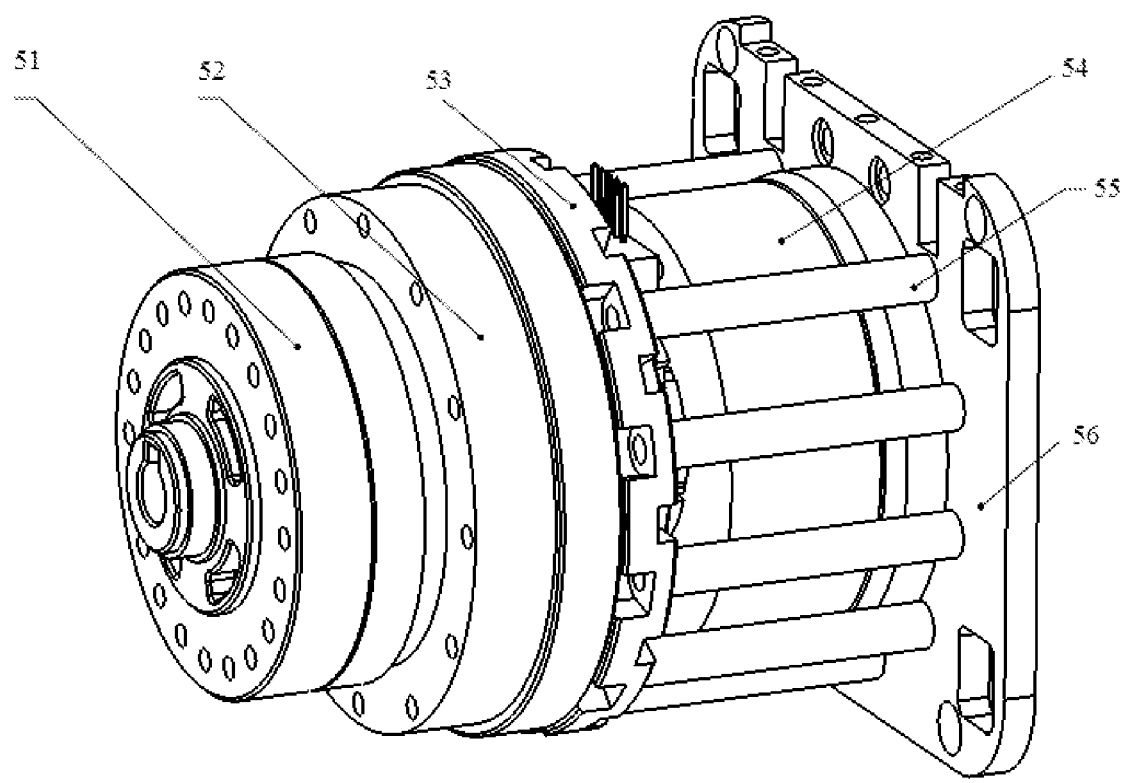
FIG. 14 is a schematic diagram of a three-dimensional structure of a first power unit.
Figure 15:
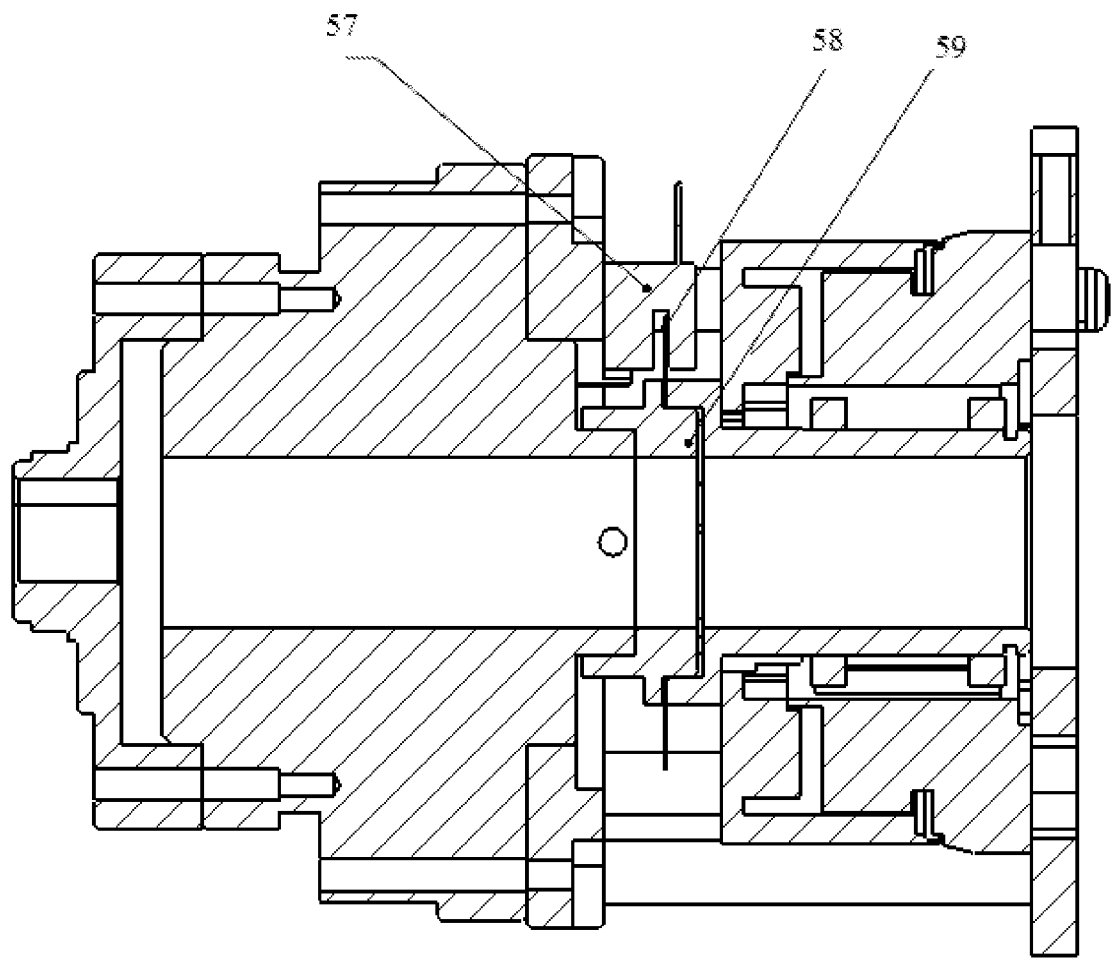
FIG. 15 is a sectional view of the structure of the first power unit.

As shown in FIGS. 14-15 which illustrates components of the first power unit, a rotating disc 51 and a harmonic reducer 52 are connected by cross recessed clamping screws, the harmonic reducer 52 and a fixing member 53 are connected with each other by cross recessed round head screws with washers and U-shaped nuts, the fixing member 53 and a mounting plate 56 are connected by a connecting rod 55 and the cross recessed round head screws with washers, and the direct current brushless motor 54 and the mounting plate 56 are connected by cross recessed round head screws with washers. The fixing member 53 and an encoder 57 are connected by hexagon socket round head blots. The connecting disc 59 and the direct current brushless motor 54 are connected by hexagon socket head blots with spring washer, and the encoding disk 58 and the connecting disc 59 are fixed by hexagon socket round head bolts.

The direct current brushless motor 54 rotates and drives the connecting disc 59 to rotate. The direct current brushless motor 54 is hollow and has no motor shaft, the connecting plate 59 is driven by the outer surface of the direct current brushless motor 54, that is, the connecting disc 59 is fixed on the front end surface of the motor by bolts, and thus is rotated by the front end surface rather than the motor shaft. The front side of the connecting disc 59 is fixed to the input shaft of the harmonic reducer 52, and through transmission of the driving force, the output end of the harmonic reducer 52 finally drives the rotating disc 51 to rotate.

Figure 16:
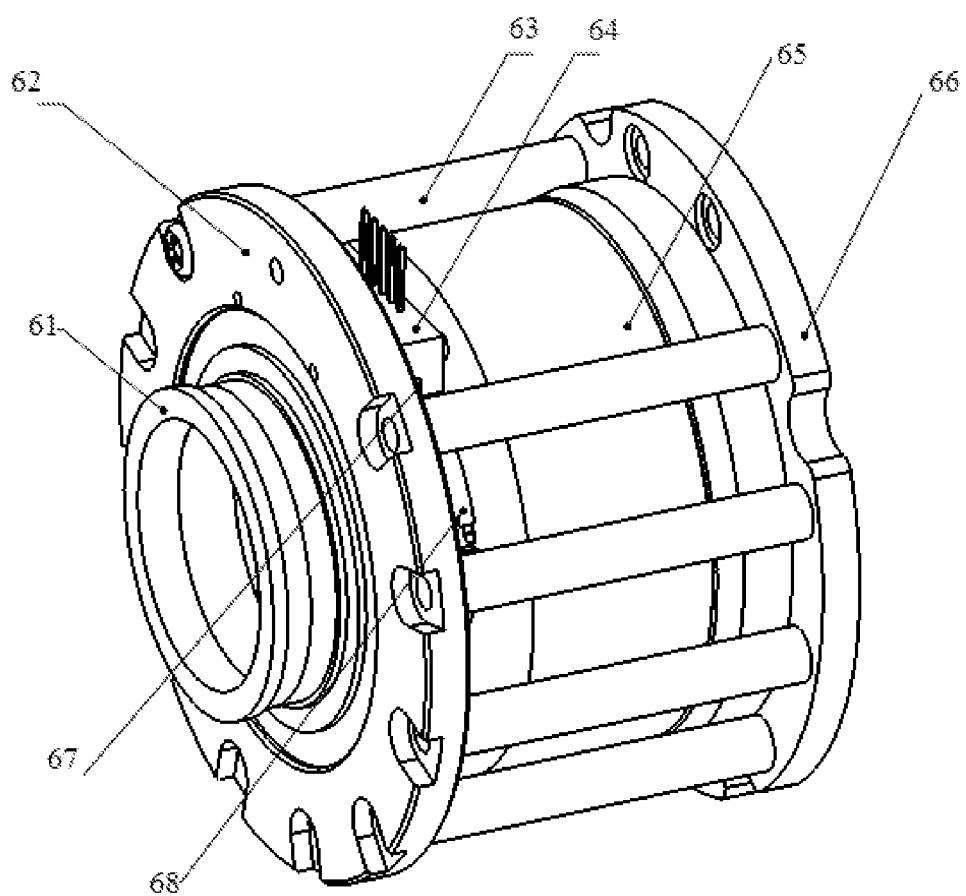
FIG. 16 is a schematic diagram of a three-dimensional structure of a second power unit.

As shown in FIG. 16, which illustrates components of the second power unit, a pressure plate 61 and a fixing member 62 of the motor disc are fixedly connected by cross recessed round head screws. The fixing member 62 and the mounting plate 66 are connected by the connecting rod 63 and cross recessed round head screws with washer. The direct current brushless motor 65 and the mounting plate 66 are connected by cross recessed round head screws with washer. The fixing member 62 and the encoder 64 are connected by hexagon socket round head bolts. The connecting disc 68 and the direct current brushless motor 65 are connected by hexagon socket head bolts with spring washer, and the encoding disk 67 and the connecting disc 68 are fixed by hexagon socket round head bolts. The direct current brushless motor 65 rotates to drive the connecting disc 68 to rotate, and a front side of the connecting disc 68 is fixed to the shaft barrel 8 through set screws to drive the bevel gear 131 to rotate.

Figure 17:
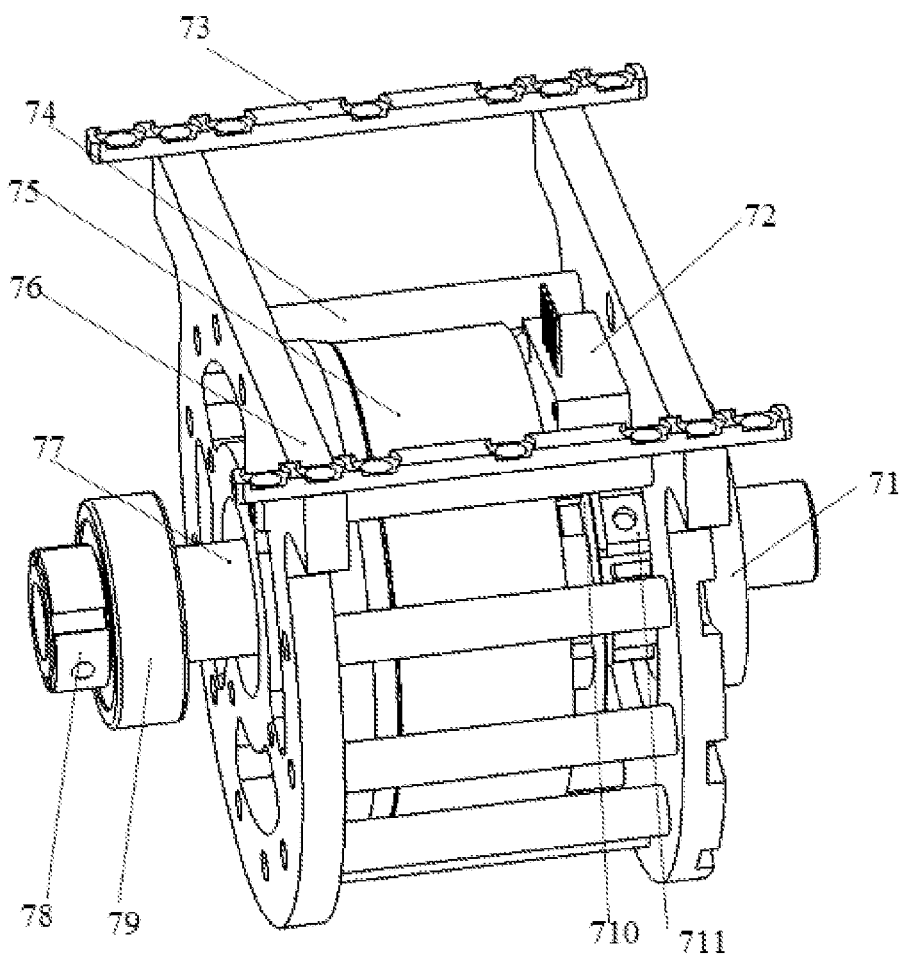
FIG. 17 is a schematic diagram of a three-dimensional structure of a third power unit.

As shown in FIG. 17, which illustrates components of the third power unit, the mounting plate 71 and the mounting plate 76 are connected through cross recessed round head screws with washer and the connecting rod 74. The pressure plate 73, the mounting plate 71 and the mounting plate 76 are fixedly connected through hexagon socket head bolts. The direct current brushless motor 75 and the mounting plate 76 are connected through cross recessed round head screws with washer. The mounting plate 71 and the encoder 72 are connected through hexagon socket round head bolts. The connecting disc 78 and the direct current brushless motor 75 are connected by hexagon socket head bolts with spring washers, and the encoder 77 and the connecting disc 78 are fixed by hexagon socket round head bolts. The direct current brushless motor 75 rotates to drive the connecting disc 711 to rotate. The front side of the connecting disc 711 is connected with a gear of the gear and rack set at the rear end of the body trunk through a key, to provide driving force for the connecting disc 711.

The power device provided by the present disclosure mainly has three parts, rotating power output, steering power output and telescopic power output. Three types of power output adopt different design and installation forms according to different assembly space and driving components, so that the overall structure of the robot is simple and compact, the space utilization rate is high, and the size of the robot is minimized on the basis of meeting power requirements. The rotating power output provides power support for overall movement of the robot in a wheeled mode and a legged mode through the main shaft. The steering power output provides power support for changes of the attack angle of the robot blade through transmission of the bevel gear set. In addition, the steering power output is controlled by software, so that is can be configured not only as a driven part for the overall movement of the robot to rotate following the movement, but also as a driving part for the robot to change the direction. The telescopic power output provides power support for switching between a wheeled mode and a legged mode of the robot through the gear and rack set.

The power device provided by the present disclosure mainly includes a harmonic reducer 52, an encoder and a direct current brushless motor. The output end of the harmonic reducer 52 provides a movement speed as required for the target mechanism, and the encoder is an effective component for analyzing motion posture and position of the robot. In order to minimize the space occupied by the motion unit, the direct current brushless motor is adopted, which effectively solves the problems of power device assembly and space occupancy, and improves motion stability of the robot.

The basic parameters of the amphibious mobile robot in this embodiment are shown in Table 1.

TABLE 1

Basic Parameters of Robot

| | |
|---|---|
| Size | 800 mm × 600 × 350 mm (in a gait mode) |
| | 640 mm × 600 mm × 200 mm(in a wheeled mode) |
| Weight | 14 KG |
| Amplitude | 130 mm |
| Attack Angle | 0-90° |
| Power | 130 V direct current motor |
| Material | 6061 aluminum alloy, 45 steel, rubber, plastic, ect. |
| Control | motor development board |

In view of shortcomings of the existing robots in various forms, and in combination with requirements for the mobile performance of the robot in different environments such as on land and underwater, it is provided a wheel-legged amphibious mobile robot with the variable attack angle. Compared with the traditional mobile amphibious robot, the present disclosure has the following advantages:

1) In a wheeled mode, the telescopic mechanism 14 contracts inwardly under the pull of the gear and rack set, so that the blade 124 can fully retract into the slotted wheel 111. The outer contour of six blades 124 of each motion unit and the slotted wheel 111 together form a "round" wheel. Two motion units are powered respectively by two driving systems, so that the robot can implement wheeled motion in stable terrain. In the wheeled mode, the robot can obtain a high movement speed, and efficiently and stably realizing movement as desired.

2) In a gait mode, the telescopic mechanism 14 expands outwardly under the push of the gear and rack set, so that the blade 124 can be fully expanded in the slotted wheel 111. The six blades of each movement unit form three "legs". Similarly, two movement units are powered by two driving systems, so that the robot can implement legged movement in complex and changeable terrain. Compared with wheeled motion, in a gait mode, the robot can better climb the steps, surmount obstacles with ups and downs, and improve environmental adaptability of the robot.

3) In underwater environment, in order to enable the robot to meet target requirements of underwater movement, aiming at the movement requirements in underwater environment, combined with land movement, in the gait mode of the robot, six blades 124 form three "legs", which can meet movement requirements of the robot which moves on road in a gait mode, and the blades 124 can help the robot to move underwater more stably and efficiently.

4) In underwater steering, when the robot is in an underwater mode and driven by the bevel gear set, the six blades 124 of each motion unit can rotate at any same angle at the same time, so as to change the attack angle. The bevel gear set of two motion units 1 are independent of each other, so that the robot can transfer in different directions and positions in underwater environment. It not only makes the robot move underwater with higher adaptability and maneuverability, but also provides a certain technical basis for subsequent environmental recognition ability of the robot.

The principle and implementation of the present disclosure are explained by specific examples of the present disclosure. The above description of the embodiments is only used to help understanding of the method and core concept of the present disclosure. Furthermore, for a general person skilled in the art, there will be changes in the specific implementation and application scope according to the concept of the present disclosure. Therefore, the contents of this specification shall not be understood as limits to the present disclosure.

What is claimed is:

1. A wheel-legged amphibious mobile robot with a variable attack angle, comprising two motion units, a body trunk, two main shafts and a power device; the two motion units have a same structure; the power device comprises two first power units, two second power units and one third power unit; one of the two motion units, one of the two second power units, one of the two first power units, the third power unit, another of the two first power units, another of the two second power unit and another of the two motion units are successively arranged in series; two ends of one of the two main shafts are fixedly connected with the one of two motion units and the one of the two first power unit respectively at one side of the third power unit, and two ends of another main shaft are fixedly connected with the another of two motion units and the another of the two first power unit at another side of the third power unit; the third power unit and the two first power units are provided within the body trunk; the power device are configured to drive the motion units to move in a wheeled mode or in a gait mode;

wherein the two motion units each comprise a wheel assembly, a transmission device, moving mechanisms and a telescopic mechanism; the wheel assembly comprises a slotted wheel, a shaft seat and a rotating disc; and the transmission device comprises a bevel gear set comprising one bevel gear and three bevel pinions; the three bevel pinions are evenly distributed around an outer periphery of the bevel gear by tooth meshing, and two gear and rack sets.

2. The wheel-legged amphibious mobile robot according to claim 1, wherein the moving mechanism each comprises blades, links, a hinge block, a sliding rod and a rotating support; the telescopic mechanism comprises a telescopic disc;

one side of the shaft seat is fixedly connected to a central position of the slotted wheel; the rotating disc is fixed at another side of the shaft seat; one end of each of the two main shafts is fixed to the shaft seat; the bevel gear is fixed to a shaft barrel on each of the two main shafts by set screws; each of the three bevel pinions is fixed to the rotating support through set screws; the third power unit drives the two gear and rack sets to move, thus drive the telescopic disc to move back and forth; a plurality of slots are uniformly distributed on the slotted wheel; one end of the link is fixedly connected to the shaft seat at a position of the shaft seat corresponding to corresponding one of the plurality of slots; another end of the link is connected with the hinge block through a bearing; the hinge block is connected with the sliding rod through a plastic bearing; two ends of the sliding rod are fixed to the blades; the blades are hinged with the rotating support, and the blades are accommodated in the corresponding one of the plurality of slots in the slotted wheel.

3. The wheel-legged amphibious mobile robot according to claim 2, wherein a plurality of lightening holes are evenly and symmetrically provided on the slotted wheel; a rotating-disc pressure plate is arranged on the rotating disc, and the rotating disc rotates synchronously with the wheel assembly; a connecting shaft of each of the three bevel pinions passes through the rotating disc and is fixedly connected with the rotating support, and the rotating support is fixed to the rotating disc.

4. The wheel-legged amphibious mobile robot according to claim 2, wherein the two gear and rack sets are gear and rack set at a front end of the body trunk and gear and rack set at a rear end of the body trunk; the rack is connected to the telescopic disc by bolts, the gear at the front end of the body trunk is connected to a bearing at a front end of a push-pull shaft of the third power unit, the gear at the rear end of the body trunk is connected to a rear end of the push-pull shaft of the third power unit by keys; the gear and rack set at the front end of the body trunk is driven passively, and a power of the gear and rack set at the rear end of the body trunk comes from driving force from the third power unit to the gear.

5. The wheel-legged amphibious mobile robot according to claim 2, wherein with help of the link, the telescopic mechanism brings the blades to expand from inside toward outside, close to an outer side of the slotted wheel, and legs each formed by two blades are evenly distributed at the outer periphery of the slotted wheel, so as to realize a switching from the wheeled mode to the gait mode of the robot; when the blades are retracted from outside toward inside, each of blades snaps into the corresponding one of the plurality of slots of the slotted wheel, so as to realize a switching from the gait mode to the wheeled mode of the robot; when the robot is in the gait mode, the rotating support rotates at any angle in the rotating disk with assistance of a bearing, which is a second degree of freedom of the robot.

6. The wheel-legged amphibious mobile robot according to claim 1, wherein the body trunk comprises a frame, a bottom plate and an adaptive tail wing; the frame comprises an upper plate and a lower plate; the upper plate is provided with a plurality of through holes; the adaptive tail wing is connected to a bottom of the lower plate connected with the upper plate, at one side of the lower plate; and a portion of the lower plate close to the bottom plate is streamlined, and the bottom plate is a transition member for connection between the lower plate and the adaptive tail wing.

7. The wheel-legged amphibious mobile robot according to claim 1, wherein each of the two first power units comprises a rotating disc, a harmonic reducer, a mounting plate, a direct current brushless motor and an encoder; the rotating disc is fixedly connected with one side of the harmonic reducer; a fixing member is installed on another side of the harmonic reducer; the fixing member is connected and fixed with the mounting plate through a connecting rod; the direct current brushless motor is fixed on the mounting plate, and the encoder is fixedly connected with the fixing member; a connecting disc is fixedly connected with the direct current brushless motor, and an encoding disk is fixed on the connecting disc.

8. A wheel-legged amphibious mobile robot with a variable attack angle, comprising two motion units, a body trunk, two main shafts and a power device; the two motion units have a same structure; the power device comprises two first power units, two second power units and one third power unit; one of the two motion units, one of the two second power units, one of the two first power units, the third power unit, another of the two first power units, another of the two second power unit and another of the two motion units are successively arranged in series; two ends of one of the two main shafts are fixedly connected with the one of two motion units and the one of the two first power unit respectively at one side of the third power unit, and two ends of another main shaft are fixedly connected with the another of two motion units and the another of the two first power unit at another side of the third power unit; the third power unit and the two first power units are provided within the body trunk; the power device are configured to drive the motion units to move in a wheeled mode or in a gait mode;

wherein each of the two second power units comprises a motor disc pressure plate, a mounting plate, a direct current brushless motor and an encoder; the motor disc pressure plate is fixedly connected with a fixing member; the fixing member is connected with the mounting plate through a connecting rod; the direct current brushless motor is fixed on the mounting plate, the encoder is fixedly arranged on the fixing member; a connecting disc is connected with the direct current brushless motor through hexagon socket head bolts with spring washers; and an encoding disk and the connecting disc are fixed by hexagon socket round head bolts.

9. A wheel-legged amphibious mobile robot with a variable attack angle, comprising two motion units, a body trunk, two main shafts and a power device; the two motion units have a same structure; the power device comprises two first power units, two second power units and one third power unit; one of the two motion units, one of the two second power units, one of the two first power units, the third power unit, another of the two first power units, another of the two second power unit and another of the two motion units are successively arranged in series; two ends of one of the two main shafts are fixedly connected with the one of two motion units and the one of the two first power unit respectively at one side of the third power unit, and two ends of another main shaft are fixedly connected with the another of two motion units and the another of the two first power unit at another side of the third power unit; the third power unit and the two first power units are provided within the body trunk; the power device are configured to drive the motion units to move in a wheeled mode or in a gait mode;

wherein the third power unit comprises two mounting plates, a direct current brushless motor, an encoder and a push-pull shaft; the two mounting plates are connected through a connecting rod; the pressure plate is fixedly connected with the two mounting plates; the direct current brushless motor is fixed on one of the two mounting plates at one side, another one of the two mounting plates at another side is connected with the encoder through hexagon socket round head bolts, and a connecting disc and the direct current brushless motor are connected through hexagon socket head bolts with spring washers; an encoding disk is fixed with the connecting disc through hexagon socket round head bolts; the push-pull shaft is fixedly connected with the connecting disc through hexagon socket head bolts; a locking stop collar is fixed on one end of the push-pull shaft through set screws.

* * * * *